P. SCOTT.
ROASTING PAN.
APPLICATION FILED APR. 24, 1909.
Reissued Dec. 7, 1909. 13,054.
Fig. 1.
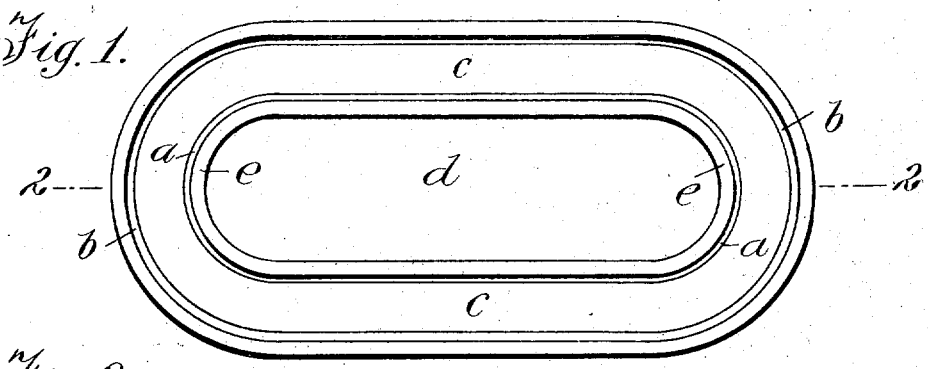
Fig. 2.
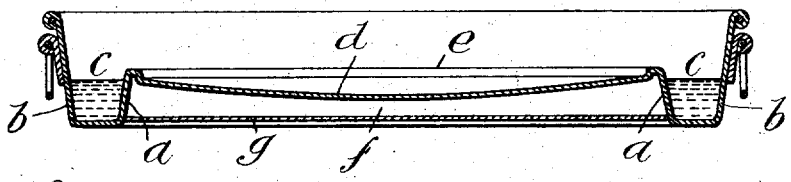
Fig. 3.
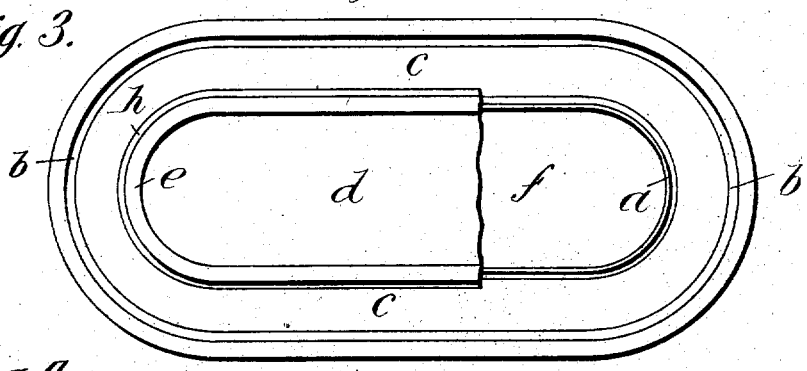
Fig. 4.
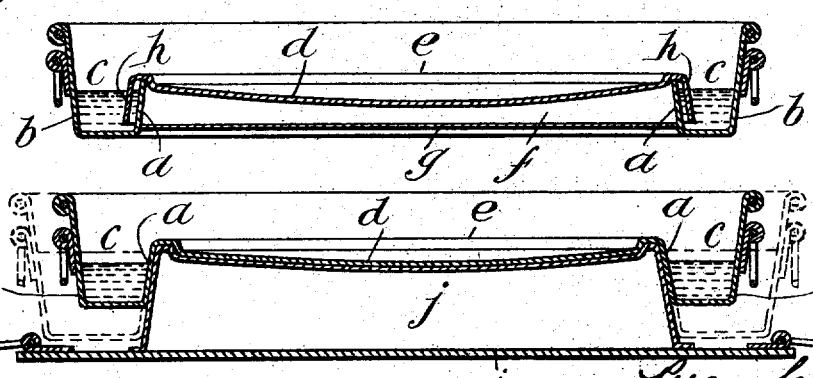
Witnesses
Albert Batchelor
Fig. 5.
Percy Scott
Inventor
By Attorney
Olof N. Mann

UNITED STATES PATENT OFFICE.

PERCY SCOTT, OF MONTREAL, QUEBEC, CANADA.

ROASTING-PAN.

13,054. Specification of Reissued Letters Patent. Reissued Dec. 7, 1909.

Original No. 875,117, dated December 31, 1907, Serial No. 289,067. Application for reissue filed April 24, 1909. Serial No. 492,091.

*To all whom it may concern:*

Be it known that I, PERCY SCOTT, of the city of Montreal, Province of Quebec, and Dominion of Canada, have invented certain new and useful Improvements in Roasting-Pans, of which the following is a specification, reference being had to the accompanying drawing, forming a part thereof.

My invention has for its object to provide a roasting pan in which the joint or other piece of meat or a fowl being roasted will be uniformly cooked and automatically basted while the gravy will be preserved and prevented from hardening and caking upon the pan, and consequently burning.

The invention may be said briefly to consist of the pan constructed as hereinafter described and pointed out in the claims.

For a full comprehension, however, of my invention reference must be had to the accompanying drawing forming a part of this specification, in which similar reference characters indicate the same parts and wherein—

Figure 1 is a plan view of my improved roasting pan; Fig. 2 is a longitudinal vertical sectional view thereof taken on line 2 2, Fig. 1; Figs. 3 and 4 are views similar to Figs. 1 and 2 and illustrating a modification of my invention, and Fig. 5 is a similar view to Fig. 2 illustrating a further modification of my invention.

The central portion of the pan is raised to produce a wall *a*, forming with the main or outer wall *b* and the intervening bottom, an annular channel or receptacle *c*, for water and adapted to support an elevated basin or table *d* having a raised margin *e*, or a depression to collect the juice or liquid fat dripping from the joint or fowl being roasted, the bottom of such depression being preferably concave. The main or outer wall *b* of the pan preferably extends above the wall *a* and marginal rim of the basin or table *d* terminating in a stiffened finishing edge, and the wall *a* incloses an insulating air space or chamber *f* below said basin or table. The basin or table *d* may be formed either integral with the wall *a*, as shown in Figs. 1, 2 and 5, or made separate therefrom, as shown in Figs. 3 and 4.

The insulating space or chamber below the raised basin or table *d* may be completely inclosed by a diaphragm *g* secured in place to the wall *a;* or if desired, the floor of the oven on which the annular bottom of the receptacle *c* rests may be relied upon for the purpose, and the diaphragm dispensed with.

When the basin or table *d* is made separate, it is preferably formed with a depending encircling rim *h* of sufficient depth to extend within close proximity of the bottom of the receptacle *c* to insure the space between the wall *a* and such rim being effectively sealed by the water contained in the said receptacle.

The amount of water required depends upon the length of time necessary to cook the meat, and as some meats require more basting in a given time than others, different pans with receptacles of different capacities and different areas are provided.

Pans made according to my invention and suitable for the last mentioned purposes, may be provided with a separate base *i*, formed with an insulating chamber *j* and adapted to support interchangeable pans, one of which is shown by full lines and another by dotted lines, in Fig. 5.

When a joint is being roasted upon one of my improved pans, the steam rising from the water with which the receptacle *c* is partially or completely filled according to requirements, forms a complete envelop, thus moistening or basting the joint, while the juice and liquid fat dripping therefrom are collected in the receptacle formed by the basin or table *d*, which when full, overflows into said water receptacle *c*. The fat being lighter than the juice, will rise to the top of the basin or receptacle *d* and overflow into the receptacle *c*, where it is purified by being boiled with the water contained therein. When the pan is taken out of the oven, the fat, which naturally rises to the surface, solidifies there and can be easily removed.

When the joint is cooked and removed from the pan the pure juice will be found in the basin or receptacle *d*, and then may either be made into sauce therein or removed therefrom.

The density and volume of the steam enveloping the joint or fowl depends upon the area and depth of the body of water exposed in the annular channel or receptacle *c* to the hot oven gases.

I claim:

1. A roasting pan having an elevated basin adapted to contain liquid, and outer and inner walls connected by a bottom and forming therewith a channel or liquid receptacle encircling said basin and extending below the same.

2. A roasting pan having a central portion provided with a raised margin and outer and inner walls connected by an intervening bottom and forming therewith a channel encircling and extending below said central portion, the inner wall inclosing an insulating air space.

3. A roasting pan having an elevated central portion provided with a raised margin and outer and inner walls connected by a bottom and forming therewith a channel or receptacle encircling said central portion and extending below the same, said outer wall extending above the inner wall and central portion and the inner wall inclosing an insulating air space below said central portion.

4. A roasting pan formed with an outer main encircling wall and a bottom, the latter having an integral central portion raised to about half the height of the main wall of the pan and formed with a concave depression therein, the space between the main wall and the wall of the central raised portion forming an encircling depression lower than the depression in such central raised portion, substantially as and for the purposes set forth.

5. A roasting pan formed with an outer main encircling wall and a bottom, the latter having an integral central portion raised to about half the height of the main wall of the pan and formed with a concave depression therein, and a plate extending across and closing the opening to the space beneath said raised central portion, the space between the main wall and the wall of the central raised portion forming an encircling depression lower than the depression in such central raised portion, substantially as and for the purposes set forth.

In witness whereof I hereto affix my signature in presence of two witnesses.

PERCY SCOTT.

Witnesses:

FRED J. SEARS,

ARTHUR H. EVANS.